United States Patent [19]

Allen

[11] Patent Number: 5,458,743

[45] Date of Patent: Oct. 17, 1995

[54] METHOD FOR PRODUCING A MIXED OXIDANT GAS

[75] Inventor: Jeffrey D. Allen, Rockland, Id.

[73] Assignee: Electrosci Inc., Santa Fe Springs, Calif.

[21] Appl. No.: 230,894

[22] Filed: Apr. 21, 1994

Related U.S. Application Data

[63] Continuation of Ser. No. 141,229, Oct. 21, 1993.

[51] Int. Cl.⁶ .............................. C25B 1/24; C25B 1/26; C25B 15/08; C25B 15/02
[52] U.S. Cl. .............................. 204/1.11; 204/95; 204/128
[58] Field of Search ........................... 204/252–258, 204/263–266, 1.11, 95, 128

[56] References Cited

U.S. PATENT DOCUMENTS

| | | | |
|---|---|---|---|
| 565,953 | 8/1896 | Andreoli . | |
| 2,887,444 | 5/1959 | Lindstaedt | 204/152 |
| 3,017,338 | 1/1962 | Butler et al. | 204/98 |
| 3,223,242 | 12/1965 | Murray | 210/139 |
| 3,282,823 | 11/1966 | Richards | 204/272 |
| 3,351,542 | 11/1967 | Oldershaw et al. | 204/149 |
| 3,375,184 | 3/1968 | Giacopelli et al. | 204/225 |
| 3,378,479 | 4/1968 | Colvin et al. | 204/248 |
| 3,669,857 | 6/1972 | Kirkham et al. | 204/151 |
| 3,775,272 | 11/1973 | Danna | 204/98 |
| 3,793,163 | 2/1974 | Dotson | 204/98 |
| 3,909,378 | 9/1975 | Walmsley | 204/98 |
| 3,951,767 | 4/1976 | Lohrberg et al. | 204/99 |
| 3,960,697 | 6/1976 | Kircher et al. | 204/252 |
| 4,010,085 | 3/1977 | Carlin | 204/128 |
| 4,069,128 | 1/1978 | Westerlund | 204/258 |
| 4,097,356 | 6/1978 | Yates | 204/237 |
| 4,248,681 | 2/1981 | Sweeney | 204/103 |
| 4,256,552 | 3/1981 | Sweeney | 204/98 |
| 4,263,119 | 4/1981 | Mose et al. | 204/257 |
| 4,308,117 | 12/1981 | Sweeney | 204/101 |
| 4,313,812 | 2/1982 | Kircher | 204/253 |
| 4,324,635 | 4/1982 | Sweeney | 204/266 |
| 4,334,968 | 6/1982 | Sweeney | 204/96 |
| 4,459,196 | 7/1984 | Iijima et al. | 204/258 |
| 4,469,577 | 9/1984 | Schmitt et al. | 204/252 |
| 4,596,648 | 6/1986 | Sweeney | 204/258 X |
| 4,804,449 | 2/1989 | Sweeney | 204/256 |
| 4,963,241 | 10/1990 | Brattan | 204/255 X |

Primary Examiner—Donald R. Valentine
Attorney, Agent, or Firm—Christie, Parker & Hale

[57] ABSTRACT

An electrolytic cell comprises an anode plate, a cathode plate, and a permeable membrane interposed between the anode and cathode plate. An anode sealing gasket is interposed between the anode plate and the permeable membrane forming an anode chamber, the anode sealing gasket may comprise a bipolar electrode. A cathode sealing gasket is interposed between the cathode plate and the permeable membrane forming a cathode chamber. An anolyte reservoir external to the anode chamber supplies anolyte to and removes mixed oxidant gases from the anode chamber. An anolyte make-up tank external to the anolyte reservoir and anode chamber supplies anolyte solution to the anolyte reservoir. The anolyte solution is transferred from the anolyte make-up tank, to the anolyte reservoir, and into the anode chamber by gravity. A catholyte reservoir external to the cathode chamber supplies catholyte to and removes gases from the cathode chamber. The catholyte in the catholyte reservoir is transported into the cathode chamber by gravity. A voltage is applied between the anode and cathode plate to effect electrolysis reactions in each chamber producing the desired quantity and proportion of mixed oxidant gas for effective water treatment.

23 Claims, 7 Drawing Sheets

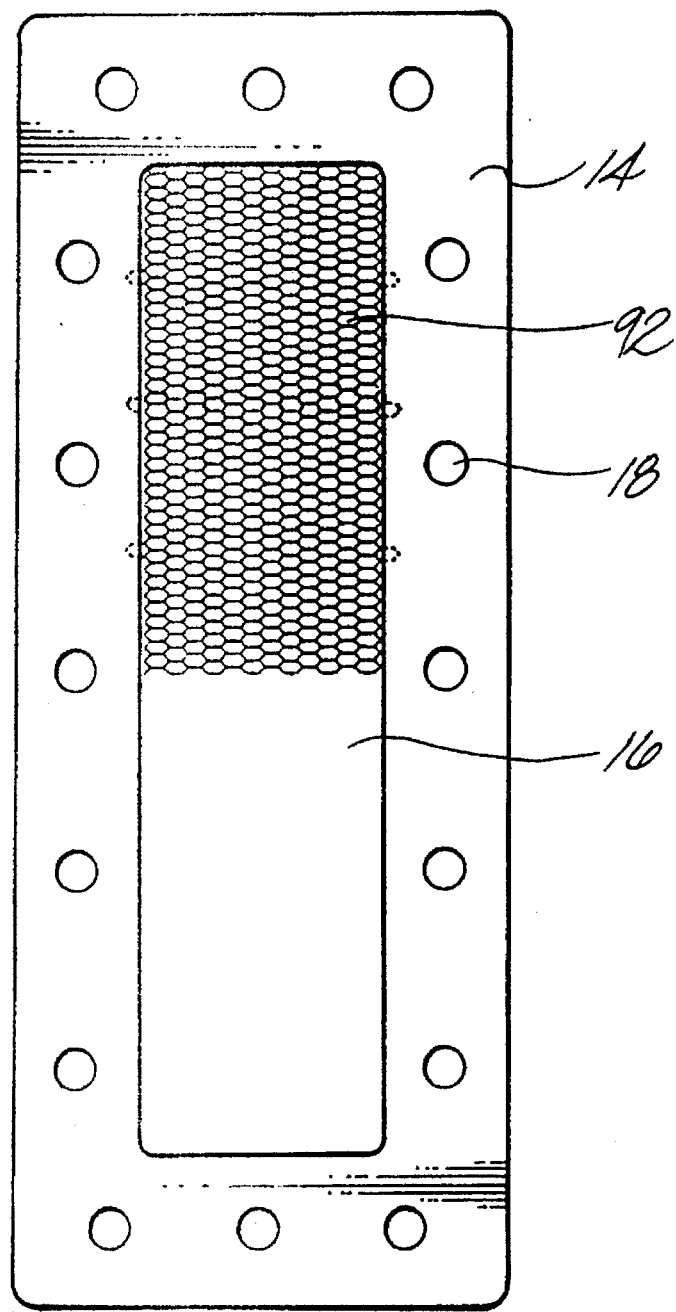

METHOD FOR PRODUCING A MIXED OXIDANT GAS

This is a continuation of application Ser. No. 08/141,229, filed Oct. 21, 1993 which is hereby incorporated by reference.

FIELD OF THE INVENTION

The present invention relates generally to an electrolytic cell for generating via electrolytic reaction an oxidant gas comprising a mixture of different chlorine containing species for treating bodies of water.

BACKGROUND OF THE INVENTION

The use of various types of water treatment chemicals for controlling biological activity such as spores, bacteria, viruses, allergy, fungi, and any other biological phenomenon that adversely affects the quality of water is well known. Chemicals added to water for the purpose of controlling scaling and corrosion are also known. Such chemicals are often used in recreational water such as swimming pools, theme parks, in industrial or commercial process water such as cooling towers and for sewage treatment and the like, and in drinking water. In light of today's increased environmental awareness, the need to both minimize the types of chemicals that are routed for sewage treatment and preserve water as a valuable resource and, therefore, the need to maximize the use and recyclability of water used for both industrial and recreational applications, is greater than ever. Accordingly, in order to maximize the utility and recyclability of the water being used in such applications it is desired that the chemical agents used to treat the water be effective in controlling biological activity, corrosion, and scaling so that the water can be reused over and over again and any blowdown water be free of noxious or toxic materials.

The use of chlorine for disinfecting bodies of water such as, swimming pools, baths, reservoirs, cooling tower water, recreational water, or any form of water that is exposed to the open air, is well known. In the past, chlorine has usually been supplied by direct application of chlorine gas ($Cl_2$) from tanks containing the gas under pressure. Chlorine has also been supplied by electrolytic generation via an electrolytic cell. Other chlorine containing gas species such as chlorine dioxide ($ClO_2$) have also been used in disinfecting bodies of water. Chlorine dioxide is a dangerous and explosive gas and is usually produced as an aqueous solution at the point of usage by chemical decomposition of chlorine salt. Production of chlorine dioxide electrochemically from chlorides was also unknown in the literature prior to about 1982.

Lindstaedt U.S. Pat. No. 2,887,444 discloses a system in which a body of water, such as a swimming pool, is provided with a low concentration of dissolved common salt and a stream of water is removed from the main body and electrolyzed to produce chlorine, and the chlorine and water stream are returned to the main body of water.

Murray U.S. Pat. No. 3,223,242 discloses another type of electrolytic cell for generating chlorine for introduction into a stream of water removed from and introduced back into a swimming pool or other body of water.

Richards U.S. Pat. No. 3,282,823 discloses an electrolytic cell for production of chlorine positioned in-line for introducing chlorine into a stream of water removed from and reintroduced into a swimming pool.

Other chlorinating systems using electrolytic cells for chlorinating bodies of water are shown in Oldershaw U.S. Pat. No. 3,351,542, Colvin U.S. Pat. No. 3,378,479, Kirkham U.S. Pat. No. 3,669,857 and Yates U.S. Pat No. 4,097,436. These electrolytic cells are disclosed in a variety of configurations and most of the cells utilize ion-permeable membranes separating the anode and cathode-containing compartments.

Ion-permeable membrane technology used in electrolytic cells is well developed. Ion-permeable membranes used in electrolytic cells have ranged from asbestos diaphragms to carboxylate resin polymers to perfluorosulfonic acid polymer membranes. The perfluorosulfonic acid membranes were developed by Dupont for use in electrolytic cells.

Dotson U.S. Pat. No. 3,793,163 discloses the use of Dupont perfluorosulfonic acid membranes in electrolytic cells and makes reference to U.S. Pat. Nos. 2,636,851; 3,017,338, 3,560,568; 3,4696,077; 2,967,807; 3,282,875 and British Pat. No. 1,184,321 as discussing such membranes and various uses thereof.

Walmsley U.S. Pat. No. 3,909,378 discloses another type of fluorinated ion exchange polymer used in membranes for electrolytic cells for electrolysis of salt solutions.

Further discussion of membrane technology used in electrolytic cells may be found in Butler U.S. Pat. No. 3,017,338, Danna U.S. Pat. No. 3,775,272, Kircher U.S. Pat. No. 3,960,697, Carlin U.S. Pat No. 4,010,085 and Westerlund U.S. Pat. No. 4,069,128.

Use of perfluorosulfonic acid membrane is also discussed in the technical literature, e.g. Dupont Magazine, May-June 1973, pages 22–25 and a paper entitled: "Perfluorinated on Exchange Membrane" by Grot, Munn, and Walmsley, presented to the 141st National Meeting of the Electrochemical Society, Houston, Tex., May 7–11, 1972.

The structure of electrodes used in electrolytic cells is set forth the previously listed patents. Additionally, the following patents show particular configurations of anodes or cathodes used in such cells.

Giacopelli U.S. Pat. No. 3,375,184 discloses an electrolytic cell with controllable multiple electrodes which are flat plates in electroplating cells.

Lohreberg U.S. Pat. No. 3,951,767 discloses the use of flat plate electrolytic anodes having grooves along the bottoms thereof for conducting gas bubbles generated in the electrolytic process.

Andreoli U.S. Pat. No. 565,953 discloses electroplating apparatus having a plurality of metal screens which are not connected in the electric circuit and function to plate out the metal being separated by the electrolysis.

In "The $ClO_2$ content of chlorine obtained by electrolysis of NaCl," Electrochemical Technology 5, 56–58 (1967) Western and Hoogland report that $ClO_2$ is not produced in the electrolysis of NaCl in the absence of chlorates.

Sweeney U.S. Pat. No. 4,256,552 discloses an electrolytic generator for chlorination of swimming pools, water systems, etc., in which a bipolar electrode is positioned in an anode compartment between an anode and an cation-exchange membrane in the wall separating the compartments.

Sweeney U.S. Pat. No. 4,334,968 discloses improvements on the cell or generator of U.S. Pat. No. 4,256,552 and discloses the production of chlorine dioxide in the cell.

Sweeney U.S. Pat. No. 4,248,681 discloses a method of producing chlorine/chlorine dioxide mixtures in the cells of U.S. Pat. Nos. 4,256,552 and 4,334,968 and gives some optimum operating conditions.

Sweeney U.S. Pat. No. 4,308,117 discloses a cell having three compartments, with an anode and cathode in the outer compartments and a bipolar electrode in the central compartment. A cation-exchange membrane is positioned in the wall between the central compartment and the cathode compartment, while an anion-exchange membrane is positioned in the wall between the central compartment and the anode compartment.

Sweeney U.S. Pat. No. 4,324,635 discloses a cell having an anode compartment, a cathode compartment, and a separating wall comprising a cation-exchange membrane therein. The cell includes a pump for circulating some of the cathode solution from the cathode compartment to the anode compartment for pH control.

Sweeney U.S. Pat. No. 4,804,449 discloses an electrolytic generator comprising an anode compartment, a cathode compartment, at least one wall separating the anode and cathode compartment comprising an ion exchange membrane therein, and at least one bipolar electrode positioned either in the anode or cathode compartment.

It has been discovered that an optimum degree of control over biological activity, scaling, and corrosion may be realized by using a gas composition comprising a mixture of chlorine gas and chlorine dioxide gas. The electrolytic devices disclosed in the above-referenced patents are concerned mainly with the generation of chlorine gas via electrolytic reaction. Many of the above-referenced patents generate the chlorine gas using a batch-type operation rather than a continuous-type operation. The use of a batch-type system is known to cause variations in the composition of the gas species produced as the concentration of the electrolyte changes during use, ultimately limiting the effectiveness of such systems. Additionally, many of the electrolytic cells known in the art operate in an electrically inefficient manner due to their construction, requiring a large input of voltage to both overcome the internal resistance of the electrolytic cell and achieve the desired electrochemical reaction.

It is, therefore, desirable that an electrolytic cell be constructed in a manner that will allow the generation of a mixed oxidant gas comprising chlorine and chlorine dioxide in a predetermined ratio to effect maximum control of biological activity, scaling, and corrosion in a body of water. It is desirable that the electrolytic cell be constructed in a manner facilitating the generation of the chlorine gas and chlorine dioxide gas in a preferred proportion without variations in such proportion during the operation of the electrolytic cell.

It is desirable that the electrolytic cell be constructed in a manner which promotes high electrical efficiency, thereby utilizing energy more efficiently in achieving the desired electrolytic reactions and producing the desired gases. It is desirable that the electrolytic cell be constructed in a manner that facilitates its operation and service in the field. It is also desirable that the electrolytic cell be constructed in a manner that is practical from both a manufacturing and an economic viewpoint.

SUMMARY OF THE INVENTION

There is, therefore, provided in practice of this invention an electrolytic cell for producing a mixed oxidant gas for controlling biological activity, corrosion, and scaling in bodies of water. The electrolytic cell comprises an anode plate, a cathode plate, and a membrane plate interposed between the anode and cathode plate. An anode sealing gasket comprising an open cavity located at its center is interposed between the anode plate and the membrane plate to form an anode chamber for accommodating a volume of anolyte solution. The anode sealing gasket may comprise a bipolar electrode extending across a portion of the open cavity. A second sealing gasket comprising an open cavity located at its center is interposed between the cathode plate and the membrane plate to form a cathode chamber for accommodating a volume of catholyte solution.

An anolyte reservoir external to the anode chamber contains a predetermined volume of anolyte and is hydraulically connected to an anolyte inlet in the anode plate for supplying the anolyte to the anode chamber. A mixed gas and anolyte outlet in the anode plate is connected to a mixed gas and anolyte inlet in the anolyte reservoir for both removing the mixed oxidant gas produced in the anode chamber and continuously circulating the anolyte through the anode chamber. The anolyte reservoir comprises an anolyte reservoir gas outlet for removing the mixed oxidant gas from the anolyte reservoir and introducing it into the body of water. The anolyte reservoir comprises an anolyte feed inlet for receiving saturated anolyte solution from an anolyte make-up tank external to the anolyte reservoir and anode chamber. The anolyte solution in the anolyte make-up tank is transported into the anolyte reservoir by gravity. The anolyte in the anolyte reservoir is transported to the anode chamber by gravity and circulated through the anode chamber by thermal convection and the migration of the mixed oxidant gas.

A catholyte reservoir external to the cathode chamber contains a predetermined volume of catholyte and is hydraulically connected to a catholyte inlet in the cathode plate for supplying the catholyte to the cathode chamber. A gas and catholyte outlet in the cathode plate is connected to a gas and catholyte inlet in the catholyte reservoir for both removing the gases produced in the cathode chamber and continuously circulating catholyte through the cathode chamber. The catholyte reservoir comprises a gas outlet for removing the gases from the catholyte reservoir. The catholyte reservoir comprises a fresh water inlet and means for regulating the introduction of the water for maintaining the specific gravity of the catholyte at a predetermined level. The catholyte in the catholyte reservoir is transported to the cathode chamber by gravity and circulated through the cathode chamber by the migration of the gases.

A voltage in the range of from three to ten volts is applied across the anode and cathode to effect an electrolysis reaction in the anode chamber producing a mixed oxidant gas comprising chlorine dioxide ($ClO_2$) and chlorine ($Cl_2$), and in the cathode chamber producing hydrogen ($H_2$) gas. The electrolysis reaction in the anode chamber is driven to completion by the efficient removal of $H_2$ gas in the cathode chamber and the migration of sodium ($Na^+$) ions from the anode chamber through a permeable membrane in the membrane plate where they react with hydroxyl ($OH^-$) ions in the cathode chamber to form sodium hydroxide (NaOH). The electrolytic cell is able to generate a preferred composition and quantity of the mixed oxidant gas using such low voltages due to the reduced electrolyte volume in the anode and cathode chambers by reason of the electrolytic cell construction comprising external anolyte and catholyte reservoirs. Additionally, the use of a continuous anolyte feed system instead of a batch-type system permits the production of an oxidant gas having a consistent proportion of the desired mixed oxidant gas species.

BRIEF DESCRIPTION OF THE DRAWINGS

These and other features and advantages of the present invention will become appreciated as the same becomes better understood with reference to the specification, claims and drawings wherein:

FIG. 7 is a plan view of an embodiment of the sealing gasket comprising a bipolar electrode.

DETAILED DESCRIPTION

An electrolytic cell provided in the practice of this invention may be used for controlling biological activity, corrosion, and scaling in large bodies of water used in either industrial or commercial applications such as cooling towers and the like, or in recreational application such as swimming pools, theme parks and the like. The electrolytic cell provides effective control of biological activity, corrosion, and scaling without the need for using supplemental chemical-type additives. The electrolytic cell does so through the electrolytic generation of an oxidant gas comprising a mixture of chlorine containing gas species that are introduced into the large body of water.

Figure 1:
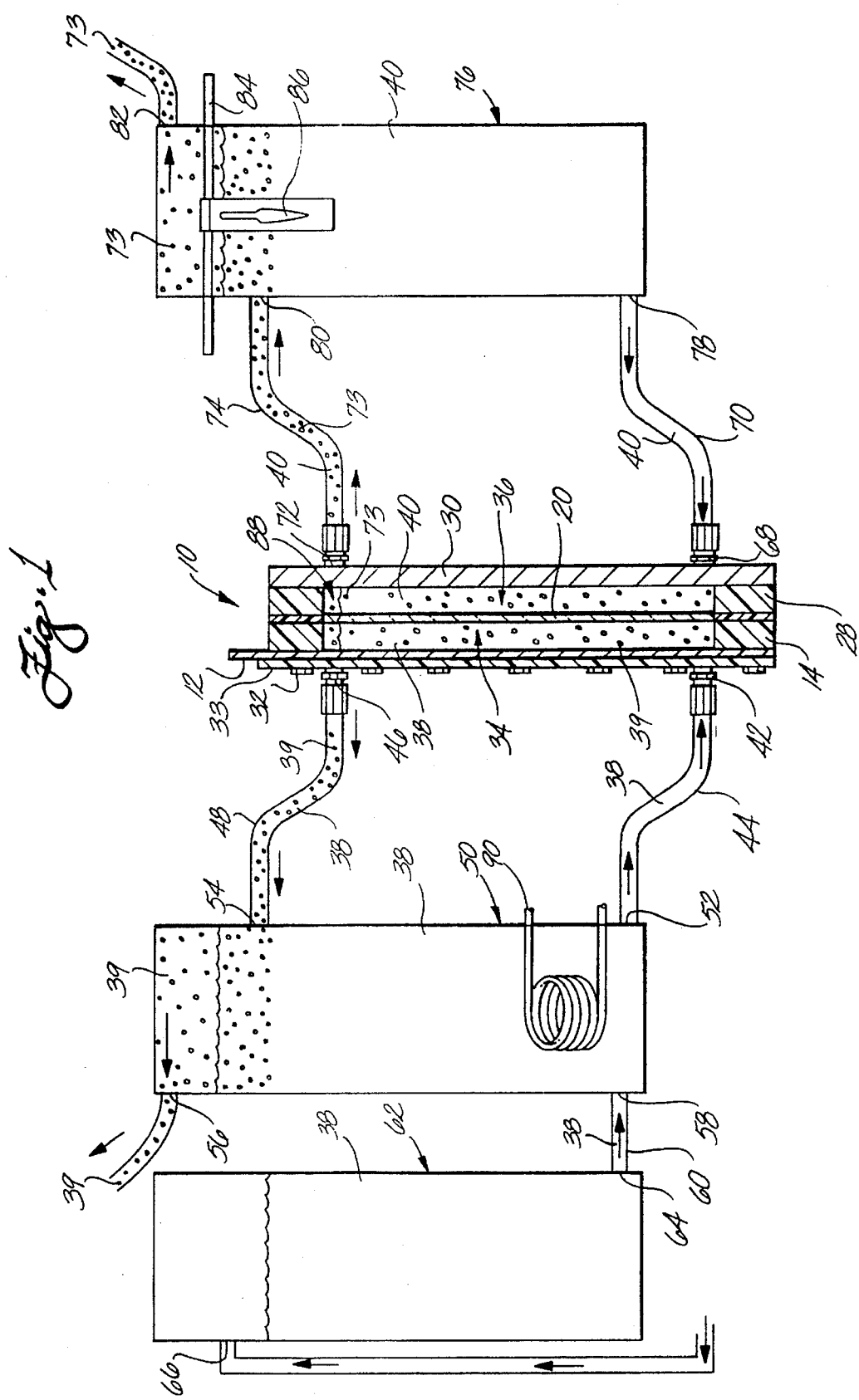
FIG. 1 is a cross-sectional semi-schematic view of a preferred embodiment of an electrolytic cell constructed according to principles of invention.

FIG. 1 shows a preferred embodiment of an electrolytic cell constructed according to principles of this invention. The electrolytic cell 10 comprises an anode plate 12 comprising a generally flat sheet of structurally rigid material having a plurality of bolt holes (not shown) arranged around its periphery. The anode plate may be constructed from any type of electrically conductive material that is chemically resistant to contact with the electrolyte and electrolysis products produced at the anode plate, electrochemically resistant to the action of oxidation, and mechanically rigid such so that it may serve as a structural member for containing the electrolyte in the electrolytic cell. Suitable materials for constructing the anode plate include niobium, columbium, zirconium, graphite, or titanium. A preferred anode plate may be constructed from titanium. Additionally, it is desirable that the surface of the anode plate that contacts the electrolyte solution within the cell be coated with an electrically conductive material. Suitable anode plate coatings include platinum, ruthenium, or iridium. Coating the anode plate with such materials is desired because the chemically and electrochemically resistant materials used to construct the anode plate are typically not good electrical conductors. Accordingly, such coating is desired in order to increase the electrical conductivity of the anode plate at the point of contact with the electrolyte solution. In a preferred embodiment, the anode plate is coated with ruthenium.

The anode plate may be configured in a variety of different geometric shapes such as square, rectangular, circular and the like. A preferred anode plate configuration is rectangular having a dimension of approximately 36 centimeters by 13 centimeters. The rectangular configuration is preferred because it is believed to affect the size and escape of the gas bubbles formed in the electrolytic cell chamber. An electrolytic cell chamber having a height greater than its width facilitates the formation of small gas bubbles in the electrolyte during the electrolysis reaction, minimizing the potential for an open circuit developing at the anode surface. The anode plate may have a thickness sufficient to provide a desired degree of structural rigidity to the electrolytic cell. In a preferred embodiment, the anode plate has a thickness of approximately two millimeters.

Figure 3:
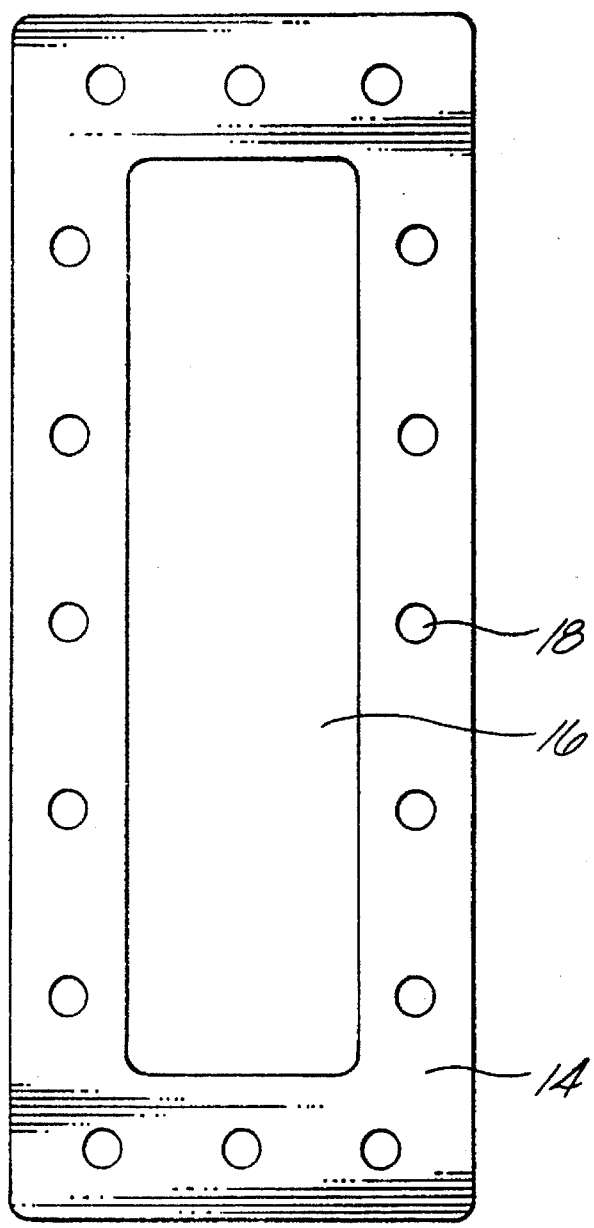
FIG. 3 is a plan view of a sealing gasket used to construct the electrolytic cell.

Moving from the anode to cathode of the cell (from left to right in FIG. 1), an anode sealing gasket 14 is adjacent to the surface of the anode plate 12. The sealing gasket may comprise a sheet of resilient material having an open cavity 16 at the central portion of the gasket as shown in FIG. 3. The sealing gasket comprises a plurality of bolt holes 18 extending around the peripheral portion of the anode sealing gasket arranged in a pattern corresponding to the plurality of bolt holes in the anode plate. The anode sealing gasket may be made from any type of structurally resilient material that is electrically nonconductive, heat resistant and chemically resistant. Suitable materials for constructing the anode sealing gasket include silicone rubber, Teflon and the like. In a preferred embodiment, the sealing gasket is made from a silicone material.

Figure 2:
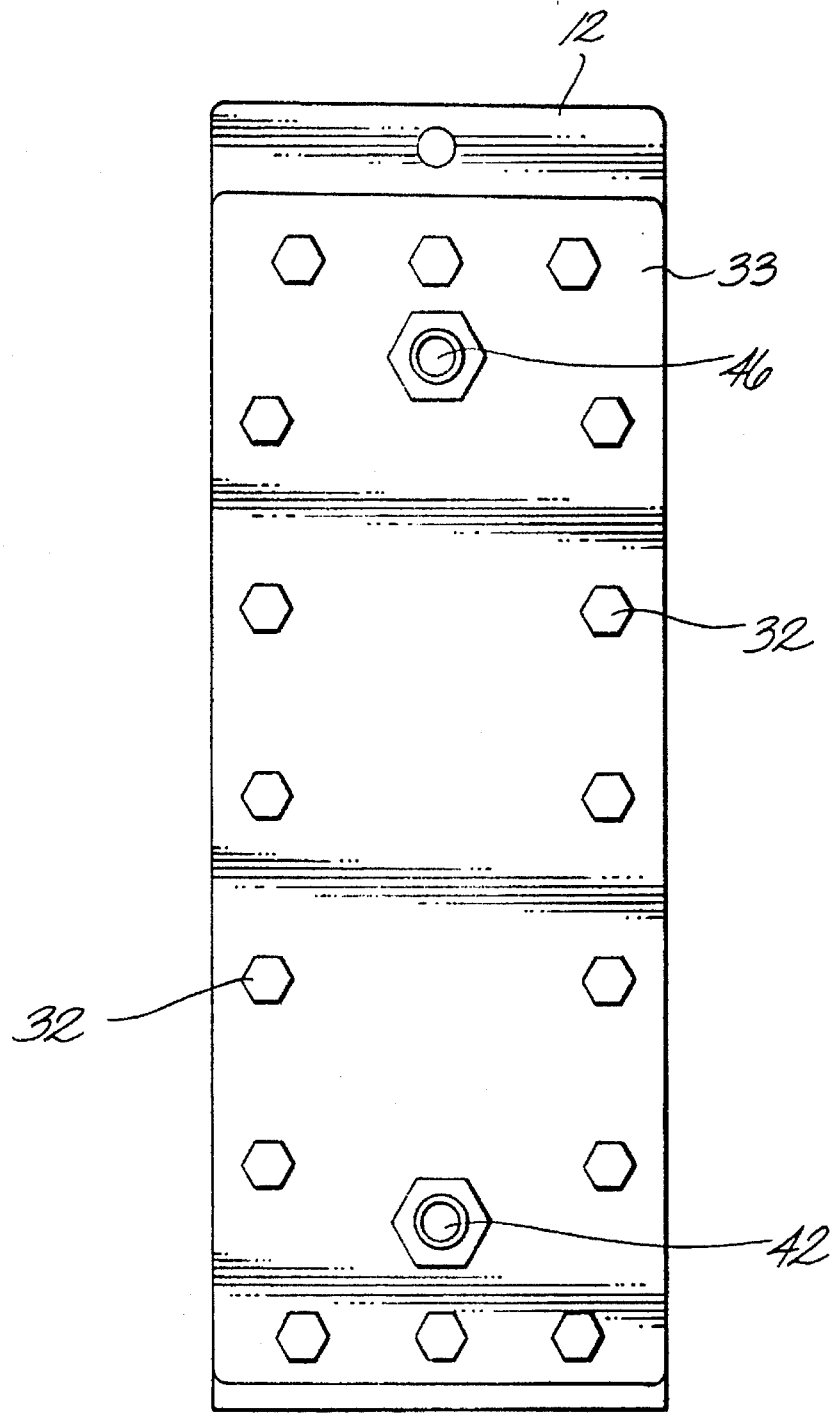
FIG. 2 is a plan view of an anode plate used in the electrolytic cell.

In order to promote effective sealing of the electrolyte within the electrolytic cell, the dimensions of the anode sealing gasket may be approximately similar to the dimensions of the anode plate. In a preferred embodiment for a cell operating at an electrical current of approximately 50 amperes, the sealing gasket may have an outside dimension of approximately 33 centimeters by 13 centimeters and the open cavity may have dimensions of approximately 25 centimeters by 6 centimeters. It is desired that the anode sealing plate be slightly smaller in length than the anode plate to facilitate electrical connection with the upper portion of the anode plate extending from the cell, as shown in FIGS. 1 and 2.

Figure 4:
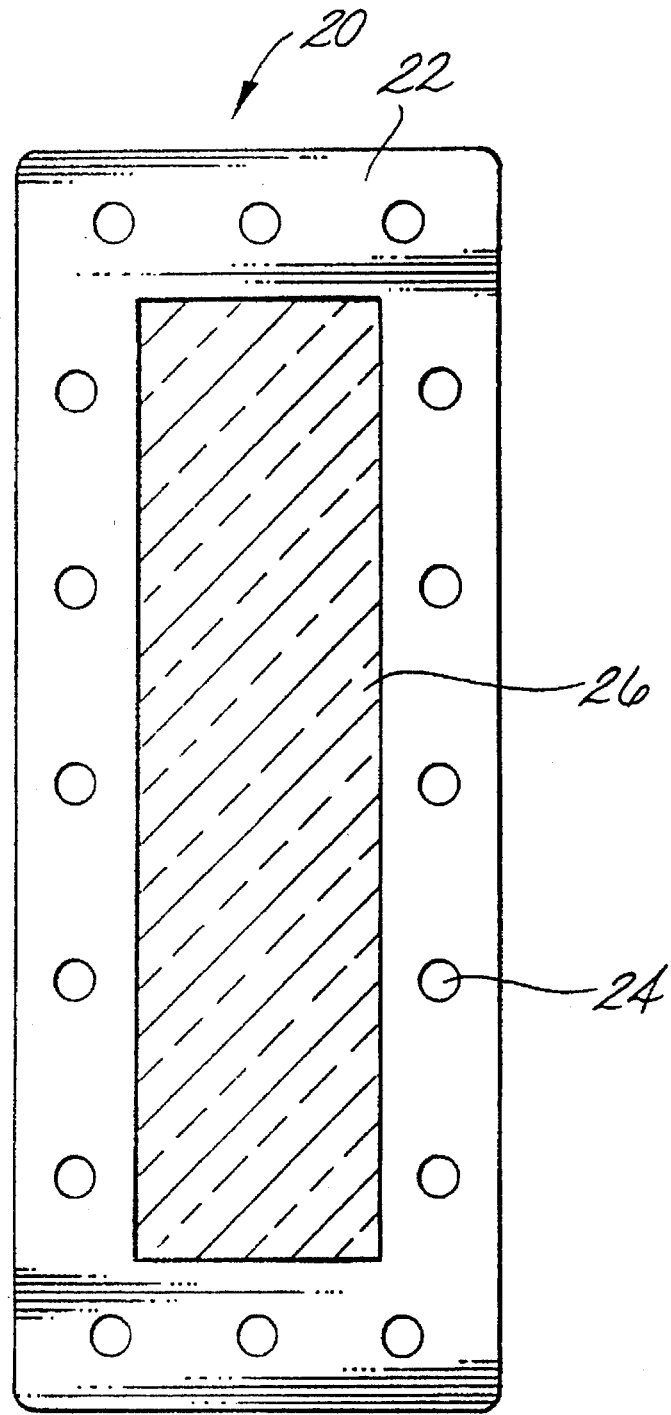
FIG. 4 is a plan view of a membrane plate comprising a permeable membrane used to construct the electrolytic cell.

A membrane plate 20 is adjacent to the surface of the anode sealing gasket 14. The membrane plate may comprise a sheet of a permeable membrane material that facilitates the transfer of cations present in the electrolyte through its surface. As shown in FIG. 4, the peripheral portion of each surface of the permeable membrane sheet may be coated with a resilient material 22 that is electrically nonconductive, heat resistant and chemically resistant, such as silicone rubber, Teflon and the like. It is desirable to coat the peripheral portion of the permeable membrane to both enhance the rigidity of the permeable membrane sheet and to provide a non-porous surface that interfaces with the anode sealing gasket to form an electrolyte-tight seal.

The membrane plate 20 may be configured having the same general shape as the anode sealing gasket 14 to provide an effective seal with the anode sealing gasket to retain the electrolyte within the electrolytic cell. A plurality of bolt holes 24 extend around the peripheral portion of the membrane plate, arranged in a pattern corresponding to the pattern of bolt holes in both the anode plate 12 and the adjacent anode sealing gasket 14.

The non-coated portion of the permeable membrane 26 may correspond in size and shape to the open cavity 16 in the anode sealing gasket. Accordingly, when placed adjacent to the anode sealing gasket, the non-coated portion of the permeable membrane 26 occupies an area of the membrane plate which corresponds in size and shape to the open cavity in the adjacent anode sealing gasket. The permeable membrane may be made from a suitable material that would permit the transfer of cations, such as sodium ($Na^+$) ions and the like, through its surface in order to facilitate the electrolysis reaction producing the desired mixed oxidant gas in the electrolytic cell. Suitable permeable membranes include those made from an ion-permeable material sold under the trade name NAFION manufactured by DuPont Chemical, or a non-ionic modacrylic material marketed under the trademark KANECARON distributed by National Filter Media of Salt Lake City, Utah. In a preferred embodiment, the permeable membrane material is KANECARON. In a preferred embodiment, the sheet of permeable membrane material may have a thickness of approximately one millimeter.

A cathode sealing gasket 28 is adjacent to the surface of the membrane plate 20. The cathode sealing gasket may have a size and shape similar to that of the anode sealing gasket 14. Accordingly, for purposes of simplicity, FIG. 3 may be referred to for purposes of illustrating the cathode sealing gasket. The cathode sealing gasket comprises a sheet of resilient material having an open cavity (similar to 16 in FIG. 3) at the center of the gasket. A plurality of bolt holes (similar to 18 in FIG. 3) extend about the peripheral portion of the sealing gasket arranged in a pattern corresponding to the plurality of bolt holes 24 in the adjacent membrane plate 20. The cathode sealing gasket may be made from the same types of resilient, chemical and heat resistant materials previously described for constructing the anode sealing gasket. In a preferred embodiment, the cathode sealing gasket is made from a silicone material.

In a preferred embodiment, the cathode sealing gasket 28 is in the shape of a rectangle having both its outside dimensions and open cavity dimensions approximately equal to the outside dimensions and open cavity dimensions previously described for the anode sealing gasket 14. Accordingly, when placed adjacent to the surface of the membrane plate 20, the open cavity of the cathode sealing gasket corresponds in size and shape with the non-coated portion of the permeable membrane 26.

A cathode plate 30 is adjacent to the surface of the cathode sealing gasket 28. The cathode plate may be made from a material that is electrically conductive, chemically resistant to the electrolyte solution and electrolysis products produced within the cell, and mechanically rigid so that it can serve as a structural member to retain the electrolyte within the electrolytic cell. Because the material selected for the cathode plate need not be electrochemically resistant, the material has a sufficient degree of electrical conductivity that an electrically conductive coating is not required. Since the oxidation reaction occurs at the anode and not the cathode, it is not necessary that the material selected for the cathode plate be electrochemically inert. Suitable materials for constructing the cathode plate may include stainless steel 316L, stainless steel 317L, or 254 SMO stainless steel. In a preferred embodiment, the cathode plate may be made from type 316L stainless steel.

The cathode plate may have a variety of shapes such as square, rectangular circular and the like. It is preferred that the cathode plate be in the shape of a rectangle for the same reasons previously described for the anode plate 12. In a preferred embodiment, the cathode plate has dimensions similar to the outside dimensions of the adjoining cathode sealing gasket 28. Like the anode plate, the cathode plate comprises a plurality of bolt holes (not shown) extending around the peripheral portion of its surface arranged in a pattern corresponding to the plurality of bolt holes in the adjacent cathode sealing gasket 28. The cathode plate may have a thickness sufficient to provide a desired degree of structural rigidity to the cell. In a preferred embodiment, the cathode plate has a thickness of approximately three millimeters.

The assembly comprising the anode plate 12, anode sealing gasket 14, membrane plate 20, cathode sealing gasket 28, and cathode plate 30 form the electrolytic cell. These elements may be fastened together by using conventional fasteners such as bolts 32. As shown in FIGS. 1 and 2, an insulating plate 33 may be adjacent to the surface of the anode plate opposite the anode sealing gasket to prevent an electrical short circuit from developing between the anode plate and cathode plate via the fastening bolts. The insulating plate may comprise a sheet of electrically nonconductive material having a plurality of bolt holes (not shown) located about its periphery arranged in a pattern corresponding to the plurality of bolt holes in the anode plate. The insulating plate is sized smaller than the anode plate, having dimensions approximately equal to the outside dimensions of the anode sealing gasket. In a preferred embodiment, the insulating plate is made from polyvinyl chloride (PVC). Additionally, to prevent an electrical short circuit between the anode and cathode plate it is desirable that the fastening bolts be coated or sleeved with an electrically nonconductive material.

An anode chamber 34 is formed in the electrolytic cell by the anode plate, anode sealing gasket, and membrane plate. The anode chamber comprises a volume defined by the open cavity in the anode sealing gasket. Similarly, a cathode chamber 36 is formed in the electrolytic cell by the cathode plate, cathode sealing gasket, and membrane plate. The cathode chamber comprises a volume defined by the open cavity in the cathode sealing gasket.

The anode chamber is designed to accommodate a volume of electrolyte solution 38 that, when subjected to the passage of electricity, undergoes electrolytic reaction to produce a mixed oxidant gas 39 comprising the desired proportion of chlorine containing gas species. In a preferred embodiment, the anode chamber has a volume of approximately 100 milliliters. The electrolyte solution in the anode chamber will hereinafter be referred to as the anolyte. Similarly, the cathode chamber accommodates a volume of different electrolyte solution 40 that, when subjected to the passage of electricity, undergoes electrolytic reaction to generate hydrogen in the cathode chamber. In a preferred embodiment, the cathode chamber has a volume of approximately 100 milliliters. The electrolyte solution used in the cathode chamber will hereinafter be referred to as the catholyte.

A suitable anolyte may comprise any water-soluble chloride salt such as sodium chloride (NaCl), potassium chloride (KCl), lithium chloride (LiCl), rubidium chloride (RbCl), cesium chloride (CsCl), ammonium chloride ($NH_4Cl$), magnesium chloride ($MgCl_2$), calcium chloride ($CaCl_2$) and the like. A suitable anolyte may also comprise a chlorite salt such as sodium chlorite ($NaClO_2$) either alone or in addition to a water-soluble chloride salts. It may be desirable for the anolyte to comprise an amount of chlorite salt because the electrolytic generation of the chloride dioxide gas ($ClO_2$) does not occur until chlorite ion ($ClO_2^-$) is present in the anolyte. In a preferred embodiment, the anolyte comprises sodium chloride (NaCl). To facilitate the electrolytic reaction occurring in the anode chamber, the catholyte selected should readily undergo electrolytic reaction such that its electrolysis products readily combine with electrolysis products of the anolyte and, thus drive the reaction in the anode chamber forming the mixed oxidant gas 39 to completion. In a preferred embodiment, the catholyte comprises sodium hydroxide (NaOH) which is formed as a reaction product between hydroxyl ions (OH$^-$), formed via electrolysis of water molecules in the cathode chamber and sodium ions (Na$^+$) formed via electrolysis of NaCl in the anode chamber. Accordingly, the catholyte may originally be water but upon operation of the cell quickly undergoes electrolysis and reacts to form the hydroxide analog of the particular anolyte selected.

To minimize the internal resistance of the electrolytic cell associated with transferring electricity through the anolyte and catholyte volume it is desired that the anode plate and cathode plate be spaced closely together. To achieve minimum internal electrical resistance the anode and cathode plate may be spaced apart a distance in the range of from six millimeters to seven centimeters. As discussed below, spacing the anode and cathode plate apart within this range also facilitates the circulation of anolyte and catholyte within the respective anode and cathode chambers. The desired spacing may be achieved by choosing the thickness of the anode and cathode sealing gaskets. In a preferred embodiment, the anode and cathode plates are spaced apart a distance of approximately thirteen millimeters. In such an embodiment, the anode and cathode sealing gasket would each have a thickness of approximately 6.5 millimeters.

An anolyte inlet 42 is located near the lower end of the anode plate extending through the anode plate and into the anode chamber, as shown near the bottom of FIGS. 1 and 2. The anode inlet comprises a threaded fitting to accommodate threadable connection with an anolyte transfer tube 44. The anolyte inlet is located a sufficient distance from the end of the anode plate so that it is not obstructed by the anode sealing gasket 14 for transfer of the anolyte into the anode chamber.

A mixed gas and anolyte outlet 46 is positioned at the upper end of the anode plate and extends through the anode plate and into the anode chamber, as shown near the top of FIGS. 1 and 2. The mixed gas outlet comprises a threaded fitting for threadable connection with a mixed gas transfer tube 48.

An anolyte reservoir 50 comprises a sealed container external to the anode chamber accommodating a predetermined volume of anolyte. The anolyte reservoir supplies anolyte to the anode chamber and receives both mixed oxidant gas generated in the anode chamber and anolyte circulated through the anode chamber. The anolyte reservoir and the anode chamber may be configured so that the ratio of anolyte in the anolyte reservoir to the anolyte in the anode chamber is in the range of from 5,000:1 to 1:1. In a preferred embodiment, the anolyte reservoir has a volume of approximately one liter. Accordingly, in a preferred embodiment, the ratio of the anolyte in the anolyte reservoir to the anolyte in the anode chamber is approximately 10:1.

The anolyte reservoir comprise an anolyte outlet 52 located at the lower end of the reservoir that is at all times flooded with the anolyte. The anolyte outlet is connected to the anolyte transfer tube 44 connected to the anolyte inlet 42 of the anode plate.

The anolyte reservoir comprises a mixed gas and anolyte inlet 54 at its upper end that is connected to the mixed gas transfer tube 48 connected to the mixed gas outlet 46 of the anode plate. The mixed gas inlet is positioned a sufficient distance from the top of the anolyte reservoir that it is below the liquid level of the anolyte in the anolyte reservoir. It is desirable to place the mixed gas inlet below the level of the anolyte to facilitate both mixed oxidant gas recovery from, and anolyte circulation through, the anode chamber. Accordingly, the mixed gas enters the anolyte within the anolyte reservoir in a two-phase stream where the gas is allowed to separate from the liquid phase before exiting the reservoir via an anolyte reservoir gas outlet 56.

The anolyte reservoir 50 comprises an anolyte feed inlet 58 near the bottom. The anolyte feed inlet is connected to an anolyte feed inlet tube 60 extending from and hydraulically connected to an anolyte make-up tank 62. The anolyte make-up tank comprises a closed container that is used to prepare and store the anolyte solution. The anolyte feed inlet tube is connected to an anolyte discharge outlet 64 positioned at the bottom of the anolyte make-up tank. The anolyte solution is prepared by opening the container and inserting a predetermined amount of the desired water-soluble chloride material, i.e., NaCl. The anolyte make-up tank comprises a fresh water inlet 66 positioned near the top of the anolyte make-up tank. The water-soluble chloride is dissolved into solution by introducing fresh water into the anolyte make-up tank. It is desired that the anolyte solution contained within the anolyte make-up tank be saturated. The specific gravity of a saturated NaCl is approximately 1.19 to 1.20.

It has been discovered that the desired proportion of $Cl_2$ and $ClO_2$ gas making up the mixed oxidant gas can be obtained when the NaCl anolyte in the anode chamber has a specific gravity of approximately 1.15, i.e., is not saturated. The difference between the specific gravity of the anolyte in the anolyte make-up tank and the anolyte reservoir is sufficient to cause gravity feeding of the anolyte solution from the anolyte make-up tank to the anolyte reservoir, via the anolyte feed inlet tube. The difference in specific gravity is sufficient to effect gravity feeding without need for increasing the pressure head of the anolyte in the anolyte make-up tank by either maintaining an anolyte level above the anolyte level in the anolyte reservoir or raising the anolyte make-up tank above the anolyte reservoir.

It has also been discovered that the production of desired proportion of $Cl_2$ and $ClO_2$ gas occurs when there is observed conversion of the chloride ions (Cl$^-$) in the anolyte to chlorite ion ($ClO_2^-$), which is the precursor to $ClO_2$ gas. Accordingly, when the $ClO_2$ gas is generated, chlorite ion (ClO2$^-$) is present in the anolyte. The presence of ClO2$^-$ ion in the anolyte as evidence of $ClO_2$ gas generation will be discussed in detail below.

It is desired to feed saturated NaCl solution to the anolyte reservoir to maintain the specific gravity of the NaCl solution in both the anolyte reservoir and anode chamber. As the electrolytic reaction proceeds in the anode chamber, the specific gravity of the anolyte contained within the anode chamber decreases due to production of $Cl_2$ gas, and the liberation of Na+ ions and their migration across the permeable membrane to the cathode chamber. The specific gravity of the anolyte in the anode chamber is maintained within the predetermined range by continuously introducing saturated NaCl anolyte solution from the anolyte make-up tank into the anolyte reservoir. The saturated NaCl entering the anolyte reservoir serves to recharge or boost the specific gravity of the anolyte in the anolyte reservoir to the desired level for generating the preferred composition of the mixed oxidant gas.

A catholyte inlet 68 is positioned near the bottom of cathode plate extending through the cathode plate to the cathode chamber. The cathode inlet port is threaded to accommodate threadable connection with a catholyte feed tube 70. A gas and catholyte outlet 72 is near the top of the cathode plate extending through the cathode plate and into the cathode chamber. The gas outlet port allows for both the circulation of catholyte through the cathode chamber and the free discharge of gases 73 generated in the cathode chamber from the electrolytic cell. The gas outlet is threaded to accommodate threadable connection with a gas transfer tube 74.

The catholyte is stored in a catholyte reservoir 76. The catholyte reservoir comprises a sealed container accommodating a volume of the catholyte. The catholyte reservoir and the cathode chamber may be configured so that the ratio of catholyte in the catholyte reservoir to the catholyte in the cathode chamber is in the range of from 5,000:1 to 1:1. In a preferred embodiment, the catholyte reservoir has a volume of approximately one liter. Accordingly, in a preferred embodiment, the ratio of the catholyte in the catholyte reservoir to the catholyte in the cathode chamber is approximately 10:1.

The catholyte reservoir comprises a catholyte outlet 78 near the bottom of the reservoir that is always flooded with the catholyte. The catholyte outlet port is threaded for connection with the catholyte feed tube 70 connected to the cathode plate 30. The catholyte reservoir comprises a gas and catholyte inlet 80 near its upper end. The gas inlet is threaded for connection with the gas transfer tube 74 connected to the cathode plate 30. In a preferred embodiment, the gas inlet is located a sufficient distance from the end of the catholyte reservoir that it is below the liquid level of the catholyte in the reservoir. It is desirable to place the gas inlet below the level of the catholyte to facilitate both gas recovery from, and catholyte circulation through, the cathode chamber. The catholyte from the cathode chamber enters the catholyte reservoir in a two-phase stream where the gas is allowed to separate from the liquid phase before exiting the reservoir via a catholyte reservoir gas outlet 82 at the top of the catholyte reservoir.

In a preferred embodiment, the NaOH solution contained within the catholyte reservoir has a specific gravity in the range of from about 1.05 to 1.13. A catholyte having a specific gravity in this range, when introduced to the cathode chamber, has been shown to promote an optimum degree of $Na^+$ ion transfer from the anode chamber, through the permeable membrane 26 and into the cathode chamber. The transfer of $Na^+$ ions from the anode chamber into the cathode chamber promotes the optimum rate of mixed oxidant gas, i.e., the electrolysis reaction in the anode chamber is driven to completion by the removal of the $Na^+$ ions from the anode chamber. A catholyte having a specific gravity of less than about 1.05 provides a concentration gradient across the permeable membrane 26 greater than that required to effect the selected transfer of $Na^+$ ions through the permeable membrane 26. Rather, the large concentration gradient produced by using a catholyte having a specific gravity of less than about 1.05 will result in the transfer of the anolyte ions, i.e., NaCl, through the membrane, reducing the amount of mixed oxidant gas generated in the anode chamber. A catholyte having a specific gravity of greater than about 1.13 will not create the desired concentration gradient across the permeable membrane to effect transfer of $Na^+$ ions from the anode chamber through the membrane, also reducing the amount of mixed oxidant gas generated at the anode chamber.

As the NaOH catholyte from the catholyte reservoir enters the cathode chamber, the water molecules present in the solution undergo electrolysis generating $H_2$ gas and $OH^-$ ions. The $OH^-$ ions and the $Na^+$ ions, transferred from the anode chamber through the permeable membrane, circulate through the cathode chamber and into the catholyte reservoir via the gas transport tube 74. Accordingly, during the operation of the electrolytic cell the concentration of $Na^+$ and $OH^-$ ions within the catholyte reservoir increases, increasing the specific gravity of the catholyte. To maintain the desired specific gravity of the catholyte in both the cathode chamber and the catholyte reservoir, the catholyte reservoir comprises a fresh water inlet 84 for diluting the catholyte by the addition of water and a catholyte blow-down outlet not shown) for maintaining the desired catholyte level and ridding the catholyte reservoir of excess $Na^+$ ion.

The catholyte reservoir may also comprise a water regulating means for regulating the amount of water entering the reservoir based on the particular specific gravity of the catholyte. In an exemplary embodiment, the water regulating means comprises a hydrometer 86 that, upon the specific gravity of the catholyte rising above 1.13, rises to a level triggering a mechanism discharging water from the fresh water inlet 84 into the catholyte reservoir. As the fresh water enters the catholyte reservoir and the catholyte level rises, excess $Na^+$ ions are purged from the reservoir via the catholyte blow-down outlet. Once the specific gravity of the catholyte approaches the desired specific gravity range, the hydrometer lowers, shutting off the discharge of water into the reservoir. This is but one embodiment of a means for regulating the specific gravity of the catholyte in the catholyte reservoir. Accordingly, it is understood to be within the scope of this invention that other means for regulating the specific gravity of the catholyte may also be used.

The electrolytic cell constructed according to principles of this invention produces a mixed oxidant gas comprising $Cl_2$ and $ClO_2$ in the anode chamber by applying a voltage differential in the range of from three to ten volts between the anode plate and cathode plate. The relatively small volume of anolyte and catholyte contained within the respective anode and cathode chambers (approximately 100 milliliters in each chamber), results in the electrolytic cell having a relatively low internal resistance. This reduced internal resistance, in turn, allows the cell to operate using only slightly more voltage than is necessary to effect the desired electrolytic reactions in the anode and cathode chambers.

Figure 5:
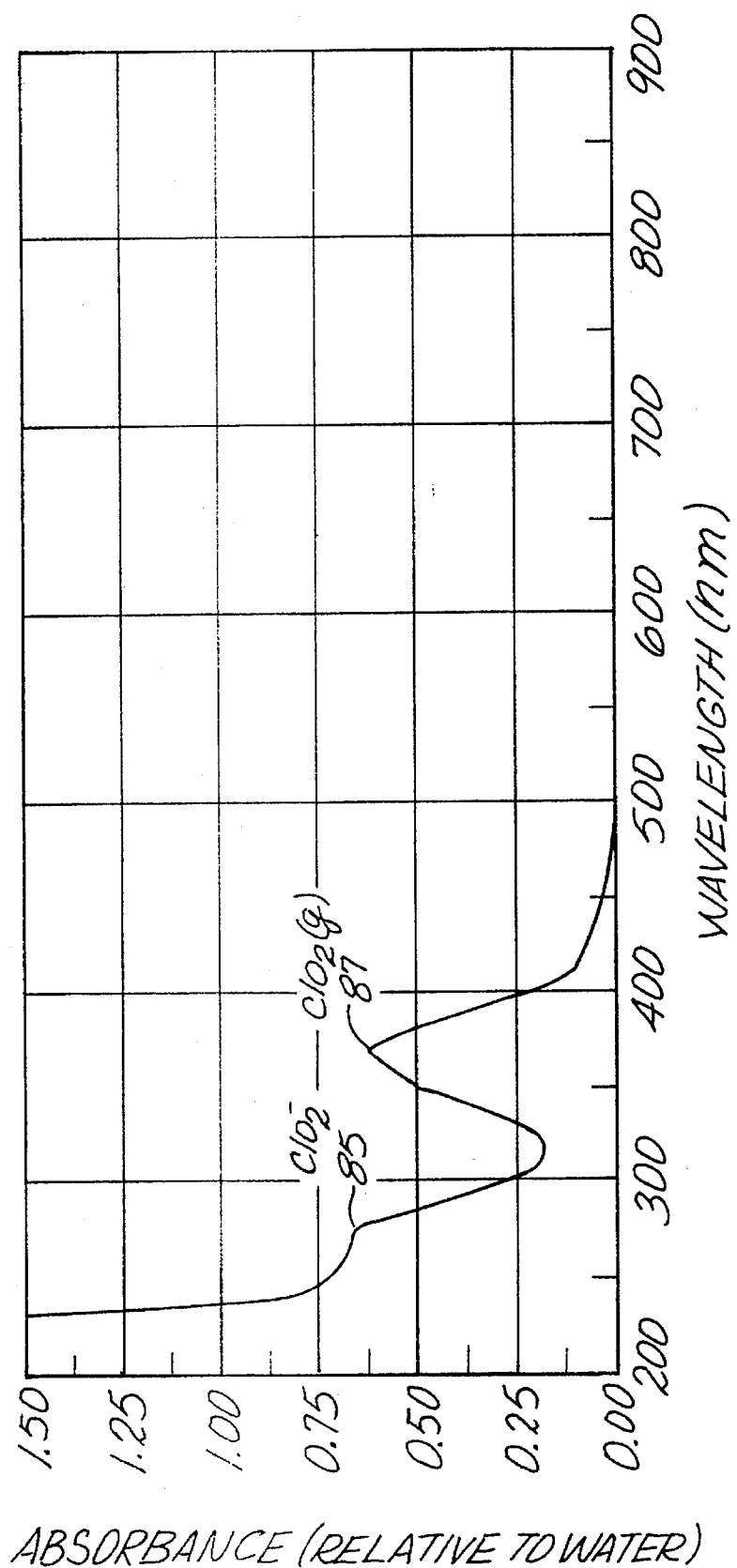
FIG. 5 is a graph illustrating an ultra-violet spectrophotometric analysis of an anolyte solution circulated within an electrolytic cell operating at steady state conditions.
Figure 6:
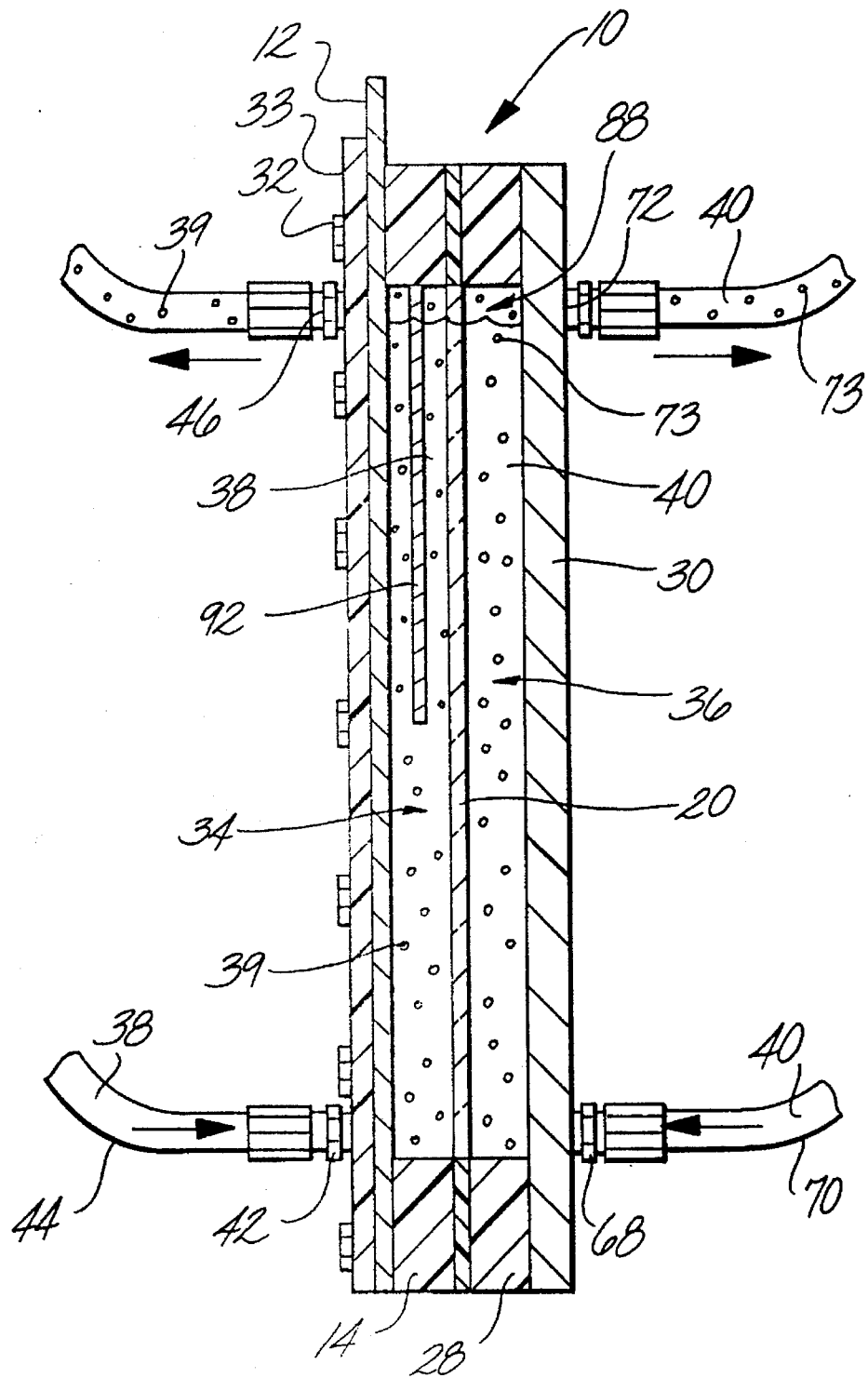
FIG. 6 is a cross-sectional semi-schematic view of an embodiment of the electrolytic cell comprising a bipolar electrode.

In the anode chamber, the NaCl is believed to undergo a number of different electrolytic reactions depending on the particular voltage applied across the anode and cathode. While not wishing to be bound by any particular theory or mechanism, the NaCl in the anode chamber is believed to undergo electrolysis to form primarily $Cl_2$ and $ClO_2$ through a series of competing electrolytic reactions. One characteristic of the reactions is the presence of $ClO_2^-$ ion in the anolyte generated by the series of the competing electrolytic reactions. FIG. 5 illustrates an ultra-violet spectrophotometric analysis of the anolyte circulated through the anode chamber when the electrolytic cell constructed according to principles of this invention is operating at steady state, i.e., after approximately five minutes of operation at an applied voltage of approximately six volts and a current of approximately 20 amperes. In FIG. 5, The presence of $ClO_2^-$ ion is indicated by an absorbance peak 85 at the wavelength of approximately 260 nanometers, the characteristic ultraviolet wavelength for ClO2– being approximately 260 nanometers. Additionally, FIG. 4 also illustrates the presence of $ClO_2$ gas in the anolyte as indicated by an absorbance peak 87 at the wavelength of approximately 375 nanometers, the characteristic ultra-violet wavelength for $ClO_2$ gas being approximately 375 nanometers.

A preferred ratio of $ClO_2$ to $Cl_2$ in the mixed oxidant gas is approximately two to one. This ratio of $ClO_2$ to $Cl_2$ is desired because it has been found that a mixed oxidant gas having such ratio produces more $ClO_2^-$ and $ClO_3^-$ ions in the body of water that the gas is injected into, which serves to capture more calcium (Ca) ions in the water to reduce scaling. Additionally, $ClO_2$ gas has the advantage of being a longer lasting oxidant than $Cl_2$ gas. Although not as strong an oxidizing agent as hypochlorite ($OCl^-$), $ClO_2$ is a moderate oxidizer that is beneficial because it is both safer to handle and is not harmful to equipment that it may contact, such as piping, pumps, heat exchangers, and the like.

According to electrochemical principles, the NaCl solution is believed to first undergo electrolysis at a low voltage to form $Na^+$ ions and $Cl^-$ ions. The $Na^+$ ions travel from the anode chamber through the non-coated portion of the permeable membrane 26 and enter the cathode chamber. With increasing voltage, the $Cl^-$ ions combine with other $Cl^-$ ions to form the desired $Cl_2$ gas. With increasing voltage applied between the anode and cathode plate the $Cl_2$ gas reacts with $H_2O$ molecules in the anolyte to form HClO. With further increasing voltage the HClO reacts with $H_2O$ molecules in the anolyte to form $HClO_2$. The amount of voltage necessary to achieve this last reaction is obtained by applying a voltage differential across the anode plate and cathode plate in the range of from about three to ten volts. Once the $HClO_2$ has been formed it reacts almost instantaneously to form the desired $ClO_2$ gas, since the voltage necessary to effect the electrolysis reaction forming the $ClO_2$ gas from the chlorite component of the $HClO_2$ is much lower than that necessary to form $HClO_2$.

These electrochemical principles are well supported by the operation of the electrolytic cell constructed according to principles of invention since. As shown in FIG. 5, during steady state operation the anolyte circulated through the anode chamber of the electrolytic cell is known to comprise both $ClO_2$ gas and $ClO_2^-$ ion, the precursor for $ClO_2$ gas. Additionally, the proportion of $ClO_2$ gas to $Cl_2$ gas produced by the cell is known to increase as the voltage applied between the anode plate and the cathode plate is increased. Accordingly, if desired one could vary or regulate the desired proportion of $ClO_2$ gas to $Cl_2$ gas by varying the voltage applied between the anode and cathode plate.

In determining the desired range for the voltage applied between the anode plate and cathode plate it was determined that the voltage should not be so high as to produce, via electrolysis of $H_2O$, $H_2O$ or $O_3$ since both of these molecules interfere with the production of $ClO_2$ gas. It was discovered that the minimum voltage applied between the anode plate and cathode plate that would result in production of $ClO_2$ gas is greater than approximately 4.25 volts, with $ClO_2$ gas being the predominate gas produced in the anode chamber at approximately 6.25 volts.

The NaOH solution entering the cathode chamber is believed to undergo a series of electrolysis reactions whereby the $H_2O$ molecules of the catholyte form $OH^-$ ions and $H_2$ gas. Therefore, to drive the electrolytic reactions in the anode chamber to completion, the electrolytic reaction in the cathode chamber must also be driven to completion. Because of the stoichiometry of the electrolysis reaction at the cathode, as much as five to six times more $H_2$ gas is created in the cathode chamber than the amount of mixed oxidant gas created in the anode chamber. Accordingly, to drive the electrolytic reactions in both the anode and cathode chamber to completion, a need exists to transport the $H_2$ gas from the cathode chamber as efficiently as possible.

The generation of $H_2$ gas in the cathode chamber causes bubbles to form in the catholyte volume during the operation of the electrolytic cell. As the bubbles are formed, they migrate through the catholyte, into a vapor space 88 in the cathode chamber, as shown in the top portion of FIG. 1. In order to promote the efficient collection of $H_2$ gas in the cathode chamber, the top portion of the open cavity in the cathode sealing gasket defining the vapor space may be convex. It is believed that a vapor space having a generally triangular top promotes the collection and transfer of $H_2$ gas from the cathode chamber.

Additionally, the diameter of the gas and catholyte outlet 72 and the gas transfer tube 74 may also be selected to both promote the efficient removal of the $H_2$ gas from the cathode chamber and control the size of the $H_2$ gas bubbles. A small positive pressure maintained on the cathode chamber is desired because it promotes the formation of small $H_2$ gas bubbles, thereby minimizing the potential for an open circuit developing at the cathode surface.

The $H_2$ transferred to the catholyte reservoir is swept from the reservoir via the gas outlet 82 and may be vented to the atmosphere or collected, stored and sold. To promote efficient electrolysis in the cathode chamber it is desired that the $H_2$ gas be removed from the catholyte reservoir at a rate sufficient to maintain the migration of the $H_2$ bubbles through the cathode chamber. In a preferred embodiment, it is desirable that the rate of $H_2$ gas removal not exceed the rate of $H_2$ gas generation so that a small amount of positive pressure is maintained in the cathode chamber to control bubble size.

The catholyte in the catholyte reservoir may be fed to the cathode chamber by a variety of transport means such as by gravity feed, pump and the like. In a preferred embodiment, the catholyte is fed by gravity. To ensure catholyte flow into the cathode chamber the catholyte level in the catholyte reservoir is higher than the catholyte level in the cathode chamber. A sufficient hydraulic head difference between the catholyte in the catholyte reservoir and the catholyte in the cathode chamber can be obtained by raising the catholyte reservoir above the electrolytic cell, as shown in FIG. 1. In a preferred embodiment, a height difference of at least twenty-five millimeters is sufficient to provide the desired hydraulic head difference.

The catholyte may be continuously circulated through the cathode chamber by the migration of $H_2$ gas bubbles (formed by electrolysis in the cathode chamber) upwards through the volume of the catholyte serving as a type of "catholyte lift," inducing the upwards circulation of the catholyte. To maximize the ability of the migrating $H_2$ gas bubbles to cause the circulation of the catholyte through the cathode chamber it is desired that the cathode plate be positioned close to the membrane plate 20, and therefore close to the opposing anode plate. A desired degree of catholyte circulation is achieved when the cathode plate and the anode plate are placed apart within the range of distances previously described.

The anolyte in the anolyte reservoir may be fed to the anode chamber by a variety of transport means such as by gravity feed, pump and the like. In a preferred embodiment, the anolyte in the anolyte reservoir is fed to the anode chamber by gravity. To ensure anolyte flow into the anode chamber the anolyte level in the anolyte reservoir is higher than that of the liquid level in the anode chamber. A sufficient hydraulic head difference between the anolyte in the anolyte reservoir and the anolyte in the anode chamber can be obtained by raising the anolyte reservoir above the electrolytic cell, as shown in FIG. 1. In a preferred embodiment, a height difference of at least twenty-five millimeters is sufficient to provide the desired hydraulic head difference.

The anolyte may be continuously circulated through the anode chamber by the migration of $Cl_2$ and $ClO_2$ gas bubbles (formed by electrolysis in the anode chamber) upwards through the volume of the anolyte serving as a type of "anolyte lift," inducing the upwards circulation of the anolyte. To maximize the ability of the migrating $Cl_2$ and $ClO_2$ gas bubbles to cause the circulation of the anolyte through the anode chamber it is desired that the anode plate be positioned close to the membrane plate, and therefore close to the opposing cathode plate. A desired degree of anolyte circulation is achieved when the anode plate and cathode plate are placed apart within the range of distances previously described. Additionally, the anolyte is circulated through the anode chamber by thermal convention via the release of thermal energy from the electrolysis reactions occurring in the anode chamber.

The mixed oxidant gas transferred to the anolyte reservoir from the anode chamber migrates through the anolyte and is collected in the head space of the anolyte reservoir. The collected gas is swept from the anolyte reservoir, via the mixed gas outlet 56, for introduction into the body of water to be treated. In a preferred embodiment, the mixed gas outlet 56 is connected by tubing to a venturi (not shown) mounted in the circulation piping for the water requiring treatment. The mixed oxidant gas enters the water by circulating the water through the venturi, causing the mixed oxidant gas to be swept from the anolyte reservoir and injected into the water. Constructed in this manner, the electrolytic cell may be used to inject the mixed oxidant gas into circulation system of the water requiring treatment for maintaining a level of mixed oxidant gas to provide the desired degree of protection against biological activity, corrosion, and scaling.

It is desired that mixed oxidant gas be removed from the anolyte reservoir at a rate slower than the rate at which the mixed oxidant gas is generated to maintain a small positive pressure in the anode chamber. Maintaining a small positive pressure in the anode chamber serves to promote the formation of small gas bubbles at the anode, minimizing the potential for an open circuit developing at the anode surface.

The electrolytic reaction occurring in the anode chamber is known to release a large amount of heat. This heat is ultimately transferred to the anode plate and the anolyte which, if not removed, may eventually cause the anolyte to boil. The boiling of the anolyte is not desired because the formation of gas bubbles in the anolyte effectively reduces the degree of contact between the anode plate and the anolyte, decreasing the efficiency of the electrolytic cell. The heat generated in the anode chamber may be removed by using a variety of well known thermal management devices such as a heat sink, i.e., mounted to the surface of the anode plate, a heat exchanger, i.e., mounted in-line with the anolyte circulation stream between the anode chamber and the anolyte reservoir, and the like. In a preferred embodiment, the heat generated in the anode chamber is controlled by routing a cooling water line 90 into and through the anolyte reservoir for cooling the anolyte entering the anode chamber, as shown in FIG. 1.

In a preferred embodiment, a current of approximately 50 amps is sufficient to provide the desired range of voltage between the anode and cathode. It has been found that an electrolytic cell with the dimensions described above and operated at approximately 50 amps, generates a sufficient amount of mixed oxidant gas to effectively control biological activity, corrosion, and scaling in industrial water applications equivalent to a 1500 ton cooling tower.

After the predetermined voltage is applied between the anode and cathode plates the electrolysis reactions begin in both the anode and cathode chamber. It has been found that the desired rate and proportion of $Cl_2$ and $ClO_2$ gas is generated in the anode chamber after approximately five minutes, reflecting the time for the electrochemical system to achieve equilibrium. The ability to achieve equilibrium after only a relatively short period is due to the construction of the electrolytic cell, i.e., the small working electrolyte volume in the anode and cathode chambers.

The time for achieving equilibrium may be reduced by preserving the equilibrium state of the anolyte and catholyte in the anode and cathode chamber, respectively, after the electrolytic cell has been shut off. If desired, the equilibrium state of the anolyte and catholyte may be preserved by installing valves (not shown) in both the mixed gas transfer tube 48 and the gas transfer tube 74. By closing these valves after the operation of the electrolytic cell, the mixed oxidant gas and the $H_2$ gas are retained within the respective cathode and anode chamber. Retaining the gases within each chamber serves to decrease the time needed to achieve equilibrium because the desired gas species are already present. Alternatively, such valves may be installed in the anolyte reservoir gas outlet 56 and the gas outlet 82 to yield similar results. By using such valves, the time necessary to achieve equilibrium upon start up may be decreased by as much as 75 percent.

The electrolyte cell having an anolyte and catholyte reservoir external to the respective anode and cathode chamber has several distinct advantages over electrolytic cells comprising integral reservoirs and chambers. The use of external electrolyte reservoirs permits the construction of an electrolytic cell having an anode and cathode chamber of reduced electrolyte volume, reducing the internal resistance of the electrolytic cell and increasing the electrical efficiency of the electrolytic cell. The use of external electrolyte reservoirs facilitates convenient maintenance and service of the electrolytic cell because the cell is both smaller and less complicated to work with. The use of external electrolyte reservoirs allows for the mixed oxidant gas to be drawn from the anolyte reservoir, and not the anode chamber where it is desirable that the equilibrium state not be upset, in order to promote efficient mixed oxidant gas generation. Accordingly, the external anolyte reservoir acts as a type of buffer, minimizing potential equilibrium upsets in the anode chamber.

Because of their large volume relative to the respective anode and cathode chambers, the anolyte and catholyte reservoirs act as a buffer to minimize specific gravity swings from occurring within each chamber. The approximately 10:1 volume difference between each reservoir and its respective cell chamber serves to buffer the electrolyte entering each cell chamber from the effects of the electrolytic process occurring in each chamber. Accordingly, using the external anolyte and catholyte reservoir allows each cell chamber to receive electrolyte having a constant predetermined composition, optimizing the ability of the cell to generate the desired composition and quantity of mixed oxidant gas.

Although limited embodiments of the electrolytic cell have been described herein, many modifications and variations will be apparent to those skilled in the art. For example, it is to be understood within the scope of invention that the electrolytic cell may be constructed incorporating the use of a bipolar electrode. FIG. 5 illustrates an embodiment of an electrolytic cell comprising a bipolar electrode 92 interposed between the anode plate 14 and the membrane plate 20. In such an embodiment the bipolar electrode may be used to improve the yield of the desired proportion of $ClO_2$ and $Cl_2$ gas via electrolysis in the anode chamber.

The bipolar electrode may be made from a structurally rigid material that is both chemically resistant to the anolyte and electrochemically resistant to the electrolysis reactions occurring in the anode chamber. Additionally, it is desirable that the bipolar electrode comprise a plurality of openings through its surface to facilitate the circulation of the anolyte through the anode chamber. It is desirable that both sides of the bipolar electrode comprise an electrically conductive coating to promote the desired electrolysis reactions in the anode chamber. Suitable conductive coatings include the same types of materials previously described for coating the anode plate. In a preferred embodiment, incorporating the use of a bipolar electrode, a bipolar electrode is made from expanded titanium and coated with an iridium material produced by Eltech of Chardon, Ohio, under the product name EC600.

FIG. 7 illustrates an embodiment of the anode sealing gasket 14 previously described comprising a bipolar electrode 92 extending across a portion of the open cavity 16. The bipolar electrode may be retained within the open cavity of the anode sealing gasket by a tongue and groove arrangement or the like. The bipolar electrode may extend across and cover the entire open cavity 16 or may only partially extend across the open cavity. It has been discovered that the optimum production of the desired mixed oxidant gas is obtained by installing the bipolar electrode in the top half of the anode sealing gasket, as shown in FIG. 7. It is to be understood that the embodiment of the anode sealing gasket plate illustrated in FIG. 7 is similar in all respects to the anode sealing gasket previously described and illustrated in FIG. 3 except for the installation of the bipolar electrode.

Accordingly, it is to be understood that, within the scope of the appended claims, the electrolytic cell constructed according to principles of invention may be embodied other than as specifically described herein.

What is claimed is:

1. A method for maintaining an anolyte solution within a specific gravity range for use in an electrolytic cell for generating a mixed oxidant gas, the method comprising the steps of:

circulating an anolyte solution at a first specific gravity to an anode chamber of the electrolytic cell from an anolyte reservoir external from the anode chamber;

circulating the anolyte solution at the first specific gravity through the anode chamber;

circulating an anolyte solution at a second specific gravity from the anode chamber to the anolyte reservoir, wherein the first specific gravity is greater than the second specific gravity; and circulating an anolyte solution at a third specific gravity to the anolyte reservoir from an anolyte make-up tank external from both the anolyte reservoir and anode chamber, wherein the third specific gravity is greater than the first specific gravity.

2. The method as recited in claim 1 wherein the step of circulating the anolyte solution at the first specific gravity from the anolyte reservoir is carried out by gravity feed.

3. The method as recited in claim 1 wherein the step of circulating the anolyte solution at the first specific gravity through the anode chamber is carried out by an upward migration of gas bubbles formed in the anode chamber during an electrolysis reaction.

4. The method as recited in claim 3 wherein the step of circulating the anolyte solution at the first specific gravity through the anode chamber is carried out by thermal convection of the anolyte solution during the electrolysis reaction.

5. The method as recited in claim 1 wherein the step of circulating the anolyte solution at the second specific gravity to the anolyte reservoir is carried out by an upward migration of bubbles formed in the anode chamber during an electrolysis reaction to the anolyte reservoir.

6. The method as recited in claim 1 wherein the step of circulating the anolyte solution at the third specific gravity to the anolyte reservoir is carried out by gravity feed.

7. The method as recited in claim 1 further comprising adding water and anolyte source to the anolyte make-up tank so that the third anolyte solution is a saturated solution.

8. The method as recited in claim 1 further comprising the step of controlling the temperature of the anolyte solution within the anolyte reservoir within a temperature range.

9. A method for maintaining an anolyte solution within a specific gravity range for use in an electrolytic cell for generating a mixed oxidant gas, the method comprising the steps of:

mixing together water and anolyte source in an anolyte make-up tank external from an anode chamber of the electrolytic cell to form a saturated anolyte solution;

circulating the saturated anolyte solution to an anolyte reservoir external from the anolyte make-up tank and anode chamber, wherein the saturated anolyte solution is combined with a non-saturated anolyte solution in the anolyte reservoir;

circulating the non-saturated anolyte solution from the anolyte reservoir to the anode chamber, wherein the non-saturated anolyte solution entering the anode chamber is circulated through the anode chamber and back to the anolyte reservoir by the migration of gas bubbles formed by an electrolysis reaction in the anode chamber; and adding water and anolyte source to the anolyte make-up tank as needed to maintain a volume of saturated anolyte solution.

10. The method as recited in claim 9 comprising circulating the saturated anolyte solution to the anolyte reservoir by gravity feed so that the non-saturated anolyte solution within the anolyte reservoir has a specific gravity within the range.

11. The method as recited in claim 10 comprising circulating the non-saturated anolyte solution to the anode chamber by gravity feed.

12. The method as recited in claim 9 comprising maintaining the non-saturated anolyte solution within the anolyte reservoir within a temperature range.

13. A method for maintaining an catholyte solution within a specific gravity range for use in an electrolytic cell for generating a mixed oxidant gas, the method comprising the steps of:

circulating a catholyte solution having a first specific gravity from a catholyte reservoir to a cathode chamber of the electrolytic cell, wherein the catholyte reservoir is external from the cathode chamber;

circulating the catholyte solution having the first specific gravity through the cathode chamber; and circulating a catholyte solution having a second specific gravity from the cathode chamber to the catholyte reservoir, wherein the first specific gravity is less than the second specific gravity.

14. The method as recited in claim 13 comprising circulating the catholyte solution having a first specific gravity from the catholyte reservoir by gravity feed.

15. The method as recited in claim 13 comprising circulating the catholyte solution having a first specific gravity through the cathode chamber by an upward migration of gas bubbles formed in the cathode chamber by electrolysis reaction.

16. The method as recited in claim 13 comprising circulating the catholyte solution having a second specific gravity from the cathode chamber to the catholyte reservoir by an upward migration of gas bubbles formed in the cathode chamber by electrolysis reaction.

17. The method as recited in claim 13 comprising adding water to the catholyte reservoir to maintain the catholyte solution contained within the catholyte reservoir within the specific gravity range.

18. The method as recited in claim 13 comprising removing excess catholyte ion from the catholyte solution contained within the catholyte reservoir to maintain the catholyte solution within the specific gravity range.

19. A method for maintaining an catholyte solution within a specific gravity range for use in an electrolytic cell for generating a mixed oxidant gas, the method comprising the steps of:

adding water to a catholyte solution contained within a catholyte reservoir to keep the catholyte solution within the specific gravity range;

circulating the catholyte solution within the catholyte reservoir to a cathode chamber of the electrolytic cell, wherein the catholyte reservoir is external from the cathode chamber; and circulating the catholyte solution entering the cathode chamber through the cathode chamber and back to the catholyte reservoir, wherein the catholyte solution entering the cathode chamber has a specific gravity less than the catholyte solution leaving the cathode chamber.

20. The method as recited in claim 19 comprising circulating the catholyte solution from the catholyte reservoir to the cathode chamber by gravity feed.

21. The method as recited in claim 20 comprising circulating the catholyte solution through the cathode chamber and back to the catholyte reservoir by an upward migration of gas bubbles formed in the cathode chamber by electrolysis reaction.

22. The method as recited in claim 19 comprising removing excess catholyte ion from the catholyte solution contained within the catholyte reservoir to maintain the catholyte solution within a specific gravity range.

23. The method as recited in claim 19 comprising adding water to the catholyte solution by use of a hydrometer to regulate a water supply that empties into the catholyte reservoir, wherein as the specific gravity of the catholyte solution falls below the specific gravity range the hydrometer lowers into the catholyte solution and effects dispensing of water into the catholyte solution.

\* \* \* \* \*